United States Patent [19]

Icking et al.

[11] 4,391,222
[45] Jul. 5, 1983

[54] MILK METER FOR MEASURING THE TOTAL AMOUNT OF MILK FROM A COW IN THE COURSE OF A MILKING

[75] Inventors: Friedrich Icking, Oelde; Friedrich Stolte, Halle, both of Fed. Rep. of Germany

[73] Assignee: Westfalia Separator AG, Oelde, Fed. Rep. of Germany

[21] Appl. No.: 337,646

[22] Filed: Jan. 7, 1982

[30] Foreign Application Priority Data

Feb. 4, 1981 [DE] Fed. Rep. of Germany ....... 3103669

[51] Int. Cl.³ .............................................. A01J 7/00
[52] U.S. Cl. ................................ 119/14.17; 119/14.08
[58] Field of Search ............... 119/14.05, 14.15, 14.17, 119/14.14, 14.08

[56] References Cited

U.S. PATENT DOCUMENTS 3,919,975 11/1975 Duncan ............................ 119/14.05

FOREIGN PATENT DOCUMENTS 2810376 9/1979 Fed. Rep. of Germany ... 119/14.17

Primary Examiner—Hugh R. Chamblee
Attorney, Agent, or Firm—Sprung, Horn, Kramer & Woods

[57] ABSTRACT

A milk meter for milking installations, for the direct measurement of the quantity of milk taken from a cow, has a separating chamber under a partial vacuum for the separation of the air from the mixture of air and milk coming from the milker, and a milk measuring chamber which is connected therewith through a permanently open inlet aperture and which is equipped with two sensors set at different levels therein. The inlet aperture is located close to the floor of the separating chamber and has an associated weir on that floor. The upper edge of the weir is at a higher level than the upper edge of the inlet aperture and the weir has a drain hole. With this system only air-free milk or milk of low air content can enter the measuring chamber.

11 Claims, 5 Drawing Figures

MILK METER FOR MEASURING THE TOTAL AMOUNT OF MILK FROM A COW IN THE COURSE OF A MILKING

BACKGROUND OF THE INVENTION

The invention relates to a milk meter for milking installations for the direct measurement of the amount of milk given by a cow during milking, having a separating chamber to which a vacuum is applied for the separation of the air from a milk-air mixture, and having a milk measuring chamber which is connected to the air separating chamber through a permanently open inlet aperture and has two sensors situated at different levels one above the other whereby discrete quantity measurements can be performed as the milk constantly flows into the air separating chamber, and the air separating chamber is equipped adjacent its floor with an outlet opening which can be closed by a valve.

A milk meter of this kind has already been proposed in U.S. application Ser. No. 266,036 filed May 22, 1981 wherein the total amount of milk yielded by the cow during milking is determined by the summation of successive individual partial quantity measurements.

In this method of measurement it is not important for the outflow to be always constant, so that the shape of the milk outlet opening is largely optional and it can be large. In this method, too, the milk meter can be made in especially small dimensions, since the accuracy of measurement is independent of the level of fill.

In the prior proposed meter, the accuracy of measurement is impaired by the fact that a complete separation of the air from the milk in the separating chamber fails to be achieved due to the short time the milk stays in the air separating chamber, and the milk taken up by the measuring chamber has a relatively high air content.

SUMMARY OF THE INVENTION

It is the object of the invention to design a milk meter of the kind mentioned in the beginning, such that only air-free milk, or milk having a negligibly small air content during the measurement, can enter into the measuring chamber.

This object is achieved by the invention in that the inlet aperture of the measuring chamber is disposed adjacent the floor of the air separating chamber, a weir extends across the floor of the air separating chamber with its upper level at a higher level than the upper edge of the inlet aperture, and the weir is provided with at least one drain hole and terminates at the inside wall of the air separating chamber, or it is achieved by the fact that the inflow to the milk measuring chamber and the outflow from the milk measuring chamber takes place through throttle orifices which are provided in a dividing wall extending upwardly from the floor.

By these designs of the air separating chamber and milk measuring chamber it is brought about that air-free milk or milk of low air content collects in forechambers or on the floor up to the height of the weir and can enter the milk measuring chamber through inlet apertures situated adjacent the weir on the forechambers. When the milk flows out, it can contain any amount of air, because due to the communication between the air separating chamber and the milk measuring chamber, the liquid columns of the aerated milk in the separating chamber and of the air-free milk in the measuring chamber are in equilibrium.

The discrete quantity measurements which are performed by means of the sensors of the milk measuring chamber are thus not falsified by the air content of the milk, so that it does not matter that a milk-air mixture of relatively high air content is present in the part of the separating chamber that is situated above the weir or outside of the forechambers.

In one advantageous embodiment of the invention, the cross section of the measuring chambers is small, less than 1/10, in proportion to the cross section of the separating chamber, and the volume of the space between the weir and the milk measuring chamber is larger than, preferably more than twice, the volume between the sensors in the milk measuring chamber.

Additional features and characteristics of the invention will be set forth hereinafter and in the following description of advantageous examples of embodiment and drawings, wherein:

DETAILED DESCRIPTION OF THE PREFERRED EMBODIMENTS

Figure 1:
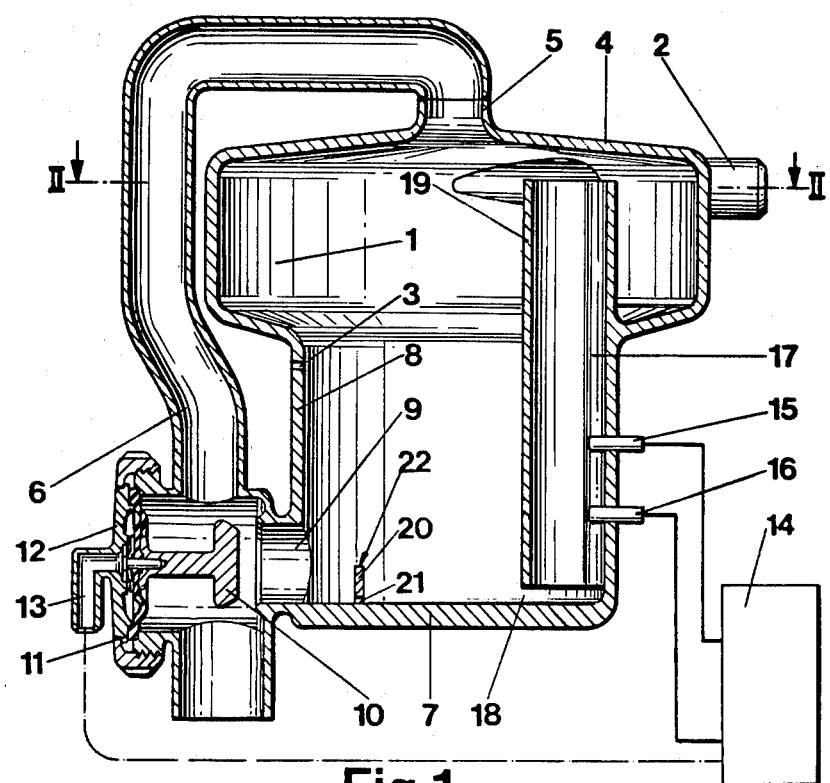
FIG. 1 is a vertical cross section through a milk meter.
Figure 2:
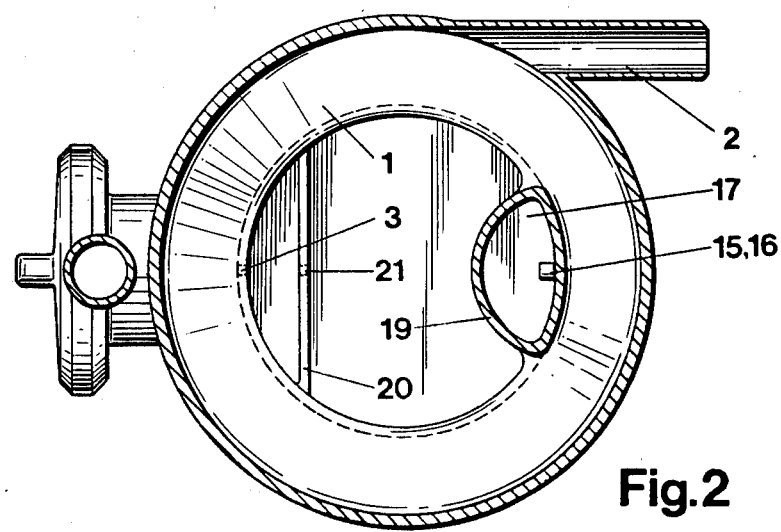
FIG. 2 is a cross section along line II—II of FIG. 1.

The milk meter illustrated in FIGS. 1 and 2 is equipped with a separating chamber 1 to which the milk-air mixture is fed tangentially through a connection 2. An air vent 3 admits air at atmospheric pressure into the separating chamber to break up the froth on the milk-air mixture. The roof 4 of the separating chamber 1 has a connection 5 for a vacuum line 6. The air separated from the milk-air mixture is removed by means of this vacuum.

The air separating chamber 1 furthermore has a floor 7 close to which an outlet opening 9 is provided in the outside wall 8 of the meter which is closed by means of a valve 10. The valve 10 is fastened to a diaphragm 11 defining the inner side of the control chamber 12, on which inner side air of atmospheric pressure or reduced pressure can act through connection 13.

The opening and closing of the valve controlling the outlet opening 9 is performed by means of an electronic control circuit 14 which is electrically connected to sensors 15 and 16 which are located at different levels in the outside wall 8 of the meter and project into the milk measuring chamber 17. The milk measuring chamber 17 is provided adjacent the floor 7 with an inlet opening 18 and has an arched inner wall 19.

A weir 20 extends across the floor 7 of the air separating chamber 1. This weir is provided with at least one drain hole 21 of small cross section. As it can be seen in FIG. 2, the weir 20 terminates at the outside wall 8 of the air separating chamber.

In the embodiment represented in FIGS. 1 and 2, the weir 20 is disposed adjacent the outlet opening 9 of the air separating chamber 1.

The upper edge 22 of the weir 20 is at a higher level than the upper edge of the inlet aperture 18. As a result, the bottom part of the air separating chamber will be filled up to the level of the weir 20 with milk that is free of air or low in air content, and the bottom end of the measuring chamber will be immersed in this milk. Consequently, only milk that is free of air or low in air content will enter into the measuring chamber.

The outlet opening 9 need not be a calibrated orifice. The level of milk in the milk measuring chamber will alternate during the measuring operation between the levels determined by the sensors 15 and 16. As soon as the surface of the column of milk in the milk measuring chamber drops to the lower sensor 16, the value 10 is shifted to the closed position and closes the outlet opening 9. In the next period the level of the milk column in the measuring chamber 17 rises until its surface reaches the upper sensor 15. The control circuit 14 then shifts the valve associated with the outlet opening 9 to the open position.

The total amount of milk is determined by the summation of the measurements, as described in the earlier U.S. patent application Ser. No. 266,036 filed May 22, 1981.

Figure 3:
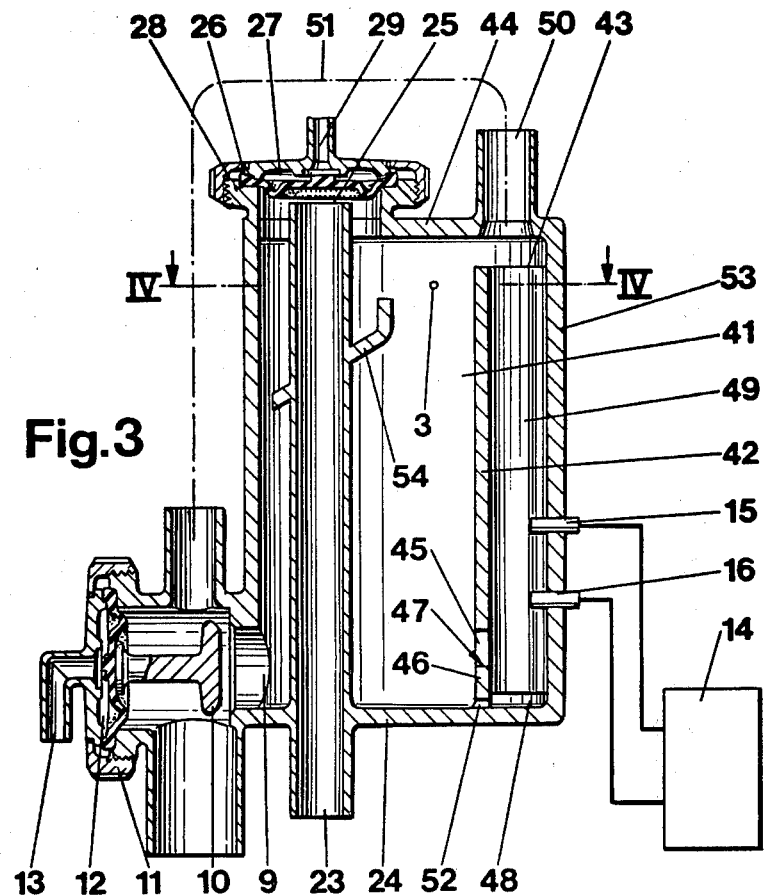
FIG. 3 is a vertical cross section through another embodiment.
Figure 4:
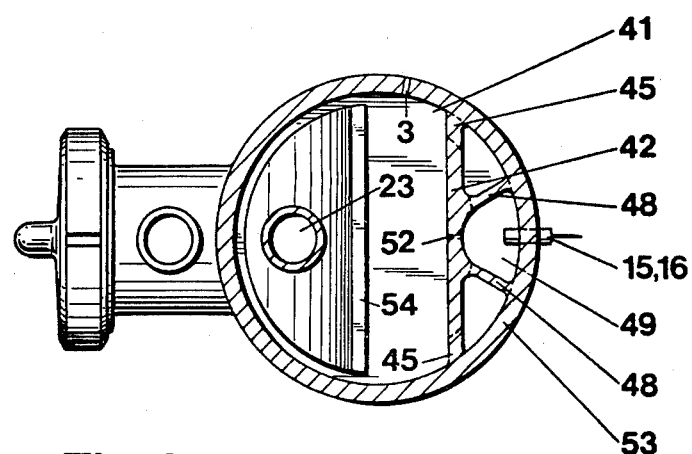
FIG. 4 is a cross section on line IV—IV of FIG. 3.

In the case of the embodiment represented in FIGS. 3 and 4, the milk-air mixture is fed in through an inlet tube 23 which extends from the floor 24 through the entire height of the apparatus. The upper opening 25 of the inlet tube 23 can be closed by air-operated valve equipped with a diaphragm 26. The valve operating chamber 27, which is defined on one side by the diaphragm 26 clamped in the valve casing 28, is acted upon by compressed air or vacuum through a connection 29.

Figure 5:
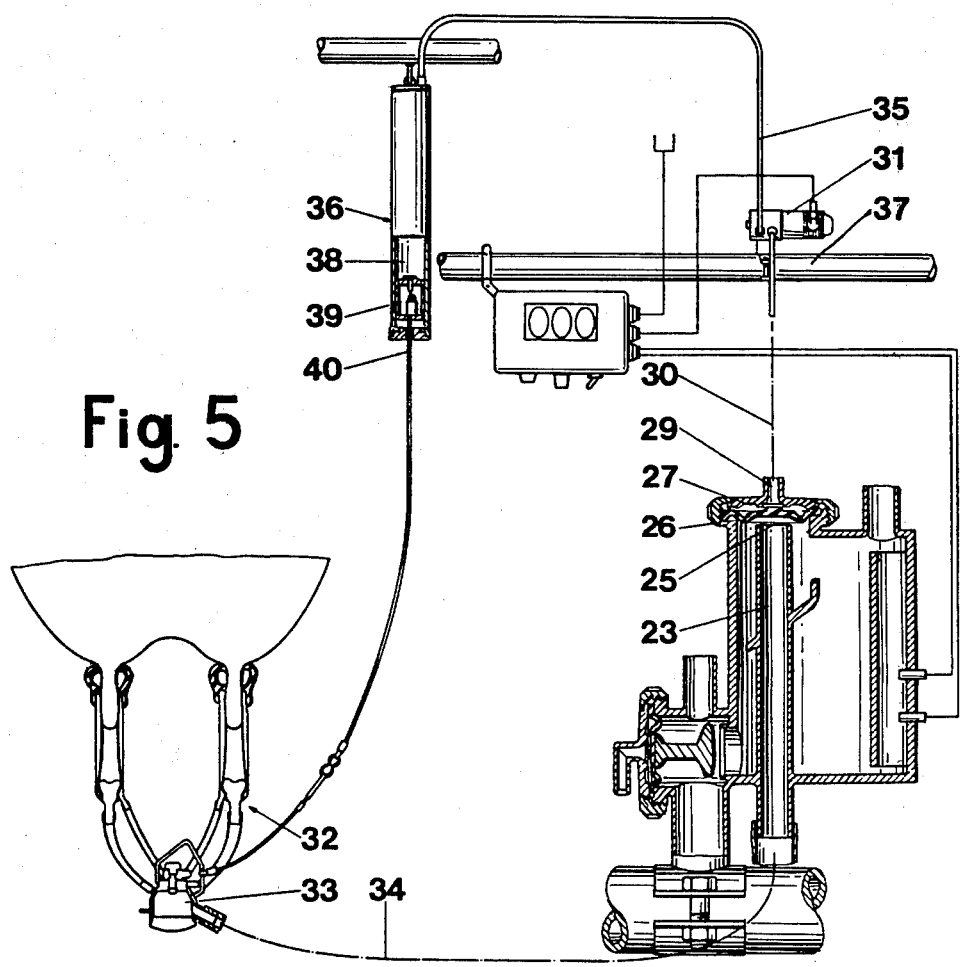
FIG. 5 is an apparatus for the automatic removal of the milker using the milk meter of FIGS. 3 and 4.

As indicated in FIG. 5, a connecting line 30 leading to a multiway slide valve 31 of an apparatus for the automatic detachment of the milker 32 and milk claw 33 from the cow can be attached to the connection 29. The inlet tube 23 is connected to the milk claw 33 by a hose 34.

A tube 35 leads from the multiway valve 31 to the disconnector 36 for detaching the milker and a pipeline 37 leads to the vacuum pump which is not shown.

Whenever the multiway valve is in the one operating position, wherein the cylinder chamber 38 is connected to a vacuum, the opening 25 of the feed tube 23 will be closed by the diaphragm 26 due to the atmospheric pressure acting in the operating chamber 27. In this position of the multiway valve 31, a piston 39, which is connected to a plunger 40, enters into the cylinder chamber 38 and pulls the milker 32 away from the cow's udder.

When the multiway valve is in the other operating position, vacuum will be produced in the operating chamber 27, so that the diaphragm 26 assumes the position represented in FIG. 3, while atmospheric pressure will prevail in the cylinder chamber 38. Under these conditions, piston 39 and the plunger 40 assume the position indicated in FIG. 5.

In the embodiment shown in FIGS. 3 and 4, the air separating chamber 41 has a dividing wall 42 whose upper edge 43 ends at a distance from the roof 44. At a distance from the floor 24, the dividing wall 42 has apertures 45 whereby a weir 46 is formed whose upper edge 47 is at a higher level than the inlet aperture 48 to the measuring chamber 49. The dividing wall 42 produces a quieting of the milk-air mixture entering downwardly, so that frothing is limited and the milk can flow without the entrainment of air into the milk measuring chamber 49 through the inlet aperture 48. At the roof 44 there is a connection 50 for a vacuum line 51. The weir 46 is provided with a drain hole 52.

As it appears from FIG. 4, the wall 42 dividing the milk measuring chamber 49 from the air separating chamber 41, adjoins the outside wall 53 of the air separating chamber.

The inlet tube 23 has a collar 54 down which the milk can flow gently from the opening 25 of the inlet tube 23 into the separating chamber 41.

As a modification of the embodiment represented in FIGS. 3 and 4, it is also possible to replace the openings 45 with throttling orifices which can be in the form of slits extending upwardly from the floor 24. In this embodiment the drain hole 52 is eliminated. The milk enters and leaves the measuring chamber 49 through the throttling slits.

In FIG. 4 it can be seen that antechambers are associated with the milk measuring chamber 49, and that through them the milk enters and leaves the measuring chamber.

It will be appreciated that the instant specification and claims are set forth by way of illustration and not limitation, and that various modifications and changes may be made without departing from the spirit and scope of the present invention.

What is claimed is:

1. In a milk meter for milking installations, for the direct measurment of the amount of milk given by a cow during milking, having a separating chamber including a floor, a roof and an outside wall, means for creating a partial vacuum in the separating chamber to effect the separation of the air from the milked milk-air mixture, a measuring chamber, means providing fluid communication between the measuring chamber and the separating chamber including a permanently open inlet aperture in the measuring chamber, two sensors situated at different levels, one above the other, in the measuring chamber for effecting discrete quantity measurements while milk is constantly being fed to the separating chamber, an outlet opening in the separating chamber adjacent the floor thereof and an actuatable valve for opening and closing the outlet opening, the improvement wherein:

the inlet aperture of the measuring chamber is disposed adjacent the floor of the separating chamber and the fluid communication means comprises means forming a weir extending from the floor of the separating chamber upwardly into the separating chamber with the upper edge thereof disposed at a higher level than the inlet aperture, terminating at the outside wall of the separating chamber and having means defining at least one drain hole therethrough.

2. The milk meter according to claim 1, wherein the diameter of the outlet opening of the separating chamber is larger than the height of the weir.

3. The milk meter according to claim 1 or 2, wherein the means forming the weir comprises a member disposed adjacent the outlet opening of the separating chamber.

4. The milk meter according to claim 1 or 2, wherein the cross section of the measuring chamber is small in proportion to the cross section of the separating chamber.

5. The milk meter according to claim 1 or 2, further comprising a vacuum line connection in the roof of the separating chamber.

6. The milk meter according to claim 1 or 2, wherein the volume of the space between the weir and the measuring chamber is greater than the volume between the sensors of the measuring chamber.

7. The milk meter according to claim 1 or 2, further comprising a milk-air mixture inlet tube which extends through the floor and through the roof of the separating chamber, an air-controlled actuatable valve having a diaphragm for opening and closing the upper end of the tube, a connecting line attached to an actuating input on the air-controlled valve for the feed of control air and a multiway slide valve connected to the other end of the connecting line to effect the automatic separation of a milker from an udder.

8. The milk meter according to claim 1, further comprising a dividing wall disposed in the separating chamber around the measuring chamber with an upper edge terminating at a distance from the roof of the separating chamber.

9. The milk meter according to claim 8, wherein the means forming the weir comprises means defining throttle orifices in the dividing wall.

10. The milk meter according to claim 9, wherein the throttle orifices in the dividing wall comprises slits extending upwardly from the floor of the separating chamber.

11. The milk meter according to claim 10, wherein the portions of the dividing wall provided with the slits form, with the outside wall, forechambers for the measuring chamber.

* * * * *